(12) United States Patent
Dover (10) Patent No.: US 11,902,449 B2
(45) Date of Patent: Feb. 13, 2024

(54) STORAGE DEVICE AUTHENTICATED MODIFICATION

(71) Applicant: Micron Technology, Inc., Boise, ID (US)

(72) Inventor: Lance W. Dover, Fair Oaks, CA (US)

(73) Assignee: Micron Technology, Inc., Boise, ID (US)

(*) Notice: Subject to any disclaimer, the term of this patent is extended or adjusted under 35 U.S.C. 154(b) by 183 days.

(21) Appl. No.: 17/040,454

(22) PCT Filed: Mar. 22, 2019

(86) PCT No.: PCT/US2019/023551
§ 371 (c)(1),
(2) Date: Sep. 22, 2020

(87) PCT Pub. No.: WO2019/183459
PCT Pub. Date: Sep. 26, 2019

(65) Prior Publication Data
US 2021/0028942 A1   Jan. 28, 2021

Related U.S. Application Data

(60) Provisional application No. 62/647,390, filed on Mar. 23, 2018.

(51) Int. Cl.
*H04L 9/32* (2006.01)
*G06F 13/42* (2006.01)
(Continued)

(52) U.S. Cl.
CPC ........ *H04L 9/3242* (2013.01); *G06F 13/4221* (2013.01); *G06F 21/79* (2013.01);
(Continued)

(58) Field of Classification Search
CPC ... H04L 9/3242; H04L 9/0891; H04L 9/0894; H04L 9/3247; G06F 13/4221; G06F 21/79
(Continued)

(56) References Cited

U.S. PATENT DOCUMENTS

| | | | |
|---|---|---|---|
| 9,729,524 B1* | 8/2017 | Brandwine | ........... H04L 9/0894 |
| 2002/0112163 A1* | 8/2002 | Ireton | ................... H04L 9/3236 |
| | | | 713/176 |

(Continued)

FOREIGN PATENT DOCUMENTS

| CN | 112074837 | 12/2020 |
|---|---|---|
| JP | 2002358011 | 12/2002 |

(Continued)

OTHER PUBLICATIONS

"International Application Serial No. PCT US2019 023551, International Preliminary Report on Patentability dated Oct. 8, 2020", 7 pgs.

(Continued)

*Primary Examiner* — Dereena T Cattungal
(74) *Attorney, Agent, or Firm* — Schwegman Lundberg & Woessner, P.A.

(57) ABSTRACT

Devices and techniques for authenticated modification of a storage device are described herein. A data transmission, received at an interface of the storage device, can be decoded to obtain a command, a set of input identifications, and a first signature corresponding to data identified by the input identifications. Members of the set of input identifications can be marshalled to produce an input set. A cryptographic engine of the storage device can be invoked on the input set to produce a second signature from the input set. The first signature is and the second signature are compared (Continued)

to determine a match. In response to the match, the input set can be written to a secure portion of the storage device.

22 Claims, 7 Drawing Sheets

(51) Int. Cl.
*G06F 21/79* (2013.01)
*H04L 9/08* (2006.01)

(52) U.S. Cl.
CPC .......... *H04L 9/0891* (2013.01); *H04L 9/0894* (2013.01); *H04L 9/3247* (2013.01); *H04L 2209/84* (2013.01)

(58) Field of Classification Search
USPC .......................................................... 713/168
See application file for complete search history.

(56) References Cited

U.S. PATENT DOCUMENTS

| | | | |
|---|---|---|---|
| 2003/0120923 A1 | 6/2003 | Gilman et al. | |
| 2003/0198082 A1* | 10/2003 | Silverbrook .......... | H04L 9/3271 365/185.04 |
| 2011/0055471 A1* | 3/2011 | Thatcher ............... | G06F 3/0679 711/216 |
| 2012/0110343 A1 | 5/2012 | Bandic et al. | |
| 2014/0068274 A1* | 3/2014 | Kasatkin ................ | G06F 21/64 713/189 |
| 2015/0161399 A1* | 6/2015 | Mylly ..................... | G06F 21/79 726/30 |
| 2015/0278118 A1* | 10/2015 | Lee ........................ | G06F 12/145 711/102 |
| 2016/0380772 A1* | 12/2016 | Gopal ..................... | G09C 1/00 713/170 |
| 2017/0124332 A1 | 5/2017 | Dover | |
| 2017/0124358 A1 | 5/2017 | Krithivas et al. | |
| 2018/0278412 A1* | 9/2018 | Dover ................... | H04L 9/0838 |
| 2018/0307625 A1* | 10/2018 | Lee ........................ | G06F 12/145 |
| 2020/0014544 A1* | 1/2020 | Sela ........................ | G06F 21/79 |
| 2020/0042465 A1* | 2/2020 | Duval ..................... | G06F 3/0659 |
| 2021/0200631 A1* | 7/2021 | Palmer .................. | G06F 11/1068 |
| 2021/0281414 A1* | 9/2021 | Lee ........................ | H04L 9/085 |

FOREIGN PATENT DOCUMENTS

| | | |
|---|---|---|
| JP | 2006155589 | 6/2006 |
| JP | 2009163738 | 7/2009 |
| JP | 2014086089 | 5/2014 |
| JP | 2014191509 | 10/2014 |
| WO | WO-2017163204 A1 | 9/2017 |
| WO | WO-2019183459 A1 | 9/2019 |

OTHER PUBLICATIONS

"International Application Serial No. PCT/US2019/023551, International Search Report dated Jun. 27, 2019", 3 pgs.
"International Application Serial No. PCT/US2019/023551, Written Opinion dated Jun. 27, 2019", 5 pgs.
"Japanese Application Serial No. 2020-551413, Notification of Reasons for Refusal dated Dec. 21, 2021", w English translation, 9 pgs.
"European Application Serial No. 19772422.2, Response filed May 14, 2021 to Communication pursuant to Rules 161(2) and 162 EPC dated Nov. 4, 2021", 8 pgs.
"Korean Application Serial No. 10-2020-7030160, Notice of Preliminary Rejection dated Oct. 5, 2021", w English translation, 6 pgs.
"European Application Serial No. 19772422.2, Extended European Search Report dated Oct. 29, 2021", 9 pgs.
"Embedded Multimedia Card eMMC, Electrical Standard 4.51, JESD84-B451", http: www.jedec.org sites default files docs JESD84-B451.pdf, (Jun. 1, 2012), 264 pgs.
"Japanese Application Serial No. 2020-551413, Notification of Reasons for Rejection dated Aug. 9, 2022", W/English Translation, 6 pgs.
"Japanese Application Serial No. 2020-551413, Response filed Mar. 17, 2022 to Notification of Reasons for Refusal dated Dec. 21, 2021", w/English Claims, 13 pgs.
"Korean Application Serial No. 10-2020-7030160, Response filed to Notice of Preliminary Rejection dated Oct. 5, 2021", w/English claims, 21 pgs.
"European Application Serial No. 19772422.2, Response filed May 26, 2022 to Extended European Search Report dated Oct. 29, 2021", Claims not amended in response filed, 3 pgs.
"Japanese Application Serial No. 2020-551413, Response filed Nov. 4, 2022 to Notification of Reasons for Rejection dated Aug. 9, 2022", w/ English Claims, 9 pgs.
"Korean Application Serial No. 10-2022-7023450, Notice of Preliminary Rejection dated Apr. 14, 2023", w/ English Translation, 5 pgs.

* cited by examiner

STORAGE DEVICE AUTHENTICATED MODIFICATION

PRIORITY APPLICATION

This application is a U.S. National Stage Application under 35 U.S.C. 371 from International Application No. PCT/US2019/023551, filed Mar. 22, 2019, published as WO 2019/183459, which claims the benefit of priority to U.S. application Ser. No. 62/647,390, filed Mar. 23, 2018, all of which are incorporated herein by reference in their entirety.

TECHNICAL FIELD

Embodiments described herein generally relate to computer storage devices and more specifically to storage device authenticated modification.

BACKGROUND

Storage devices are computer hardware designed to store data. Storage devices can be known as memory, mass storage, or the like. Storage devices generally include media to hold data (e.g., bits, bytes, blocks, etc.) controller hardware and an interface to facilitate querying the data and, in write capable storage devices, to write data.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

With the increased computerization of many manufactured goods—such as computerized control systems of vehicles, computerized (e.g., smart) appliances or sensors (e.g., Internet of Things (IoT) devices), among others—storage devices are now found in many goods that are not traditionally thought of as computers. Computerization of these goods can be done over time and can be difficult to change. For example, the automotive controller area network (CAN) bus is a vehicle communications standard to allow linking of various controllers. However, as vehicles can be long-lived, these systems can have vulnerabilities or weakness unknown at the time of standardization that are prohibitively difficult or expensive to fix. Further, that many expensive manufacturing processes can be created to implement one standard, even new vehicles can include an outdated or unsecure standard in order to maintain compatibility with the controllers of a variety of vendors, for example.

Security concerns regarding users, data, or executable programs are generally prevalent in all computing platforms. Due to the general inflexibility of embedded systems, such as those included in the manufactured goods discussed above, embedded system security often lags behind that of more general computing devices. However, even in general computing devices, designing new host boards (e.g., motherboards) to include additional security hardware can be cost prohibitive. What is needed is enhanced security hardware that can interface with other computing components in general or embedded computer systems without modifying the other hardware components.

To address the previously discussed issues, a storage device is modified to include cryptographic components, such as a cryptographic engine (e.g., a hash engine). The storage device is also enhanced to accept additional commands from an external entity (e.g., a processor, device, etc.) to invoke a number of cryptographic operations performed by the cryptographic engine. The additional command operates in a manner similar to other commands provided by external entities to the storage device, such as data reads or writes. Accordingly, the hardware interface of the storage device to a system remains the same allowing the storage device to be included, without modification, to existing systems. Software of existing systems can be modified, however, to invoke the cryptographic operation commands and thus gain the benefit of the cryptographic components of the storage device. This arrangement permits the cryptographic enhancement of systems, including embedded systems, without redesigning manufacturing processes for these systems.

One such cryptographic command includes a block (or other storage measure such as a page) unlock. Here, a block of storage can be locked, for example, when a storage device powers on, restarts, or in response to a command. To unlock the block the host (or other entity) includes a cryptographic hash along with an unlock command. The cryptographic hash can include a secret from the storage device-achieved during an earlier authentication of the caller to the storage device or via configuration of the caller, providing an authentication for the caller. The caller can then write to the unlocked block. This procedure generally protects the block from an unauthorized write, and thus may be used to store critical information, such as operating parameters. There can, however, exist a race condition in which the block is unlocked and an unauthorized writer performs a write while the block is unlocked.

To address the race condition for secure writes, the data being written can itself be signed instead of, or in addition to, relying on a command signature to unlock a block. Here, the caller (e.g., entity performing the write) can buffer the data on an unsecured portion of the storage device. If the storage device has enough volatile memory cache, the data may be buffered there, but many storage devices, such as NOR flash devices, have limited volatile memory caches. Thus, the data is buffered in an unsecured portion of the non-volatile storage of the storage device. The caller then initiates a command, which may be called auth_modify, to store the data into a secure portion of the storage device. The command includes identification of the data (e.g., an address range of the unsecured storage in which the data is buffered) and a signature of the data computed by the caller. The storage device computes its own signature of the data using its cryptographic engine and compares the two signatures. When they match, the data is moved to the secure portion. If the signatures do not match, then the auth_modify command fails. The secure portion is configured in the storage device. Part of this configuration includes causing standard programming (e.g., write, or update) commands to fail when directed to the secure portion. In an example, read commands operate normally. Thus, any entity can read the data in the secure portion. In an example, the storage device can provide a signature of the data in the secure portion along with, or paired with, a read. Thus, a reading entity can verify that there is no other entity (e.g., a "man-in-the-middle") modifying the critical data between the storage device and the reading entity. Additional examples and details are described below.

Figure 1:
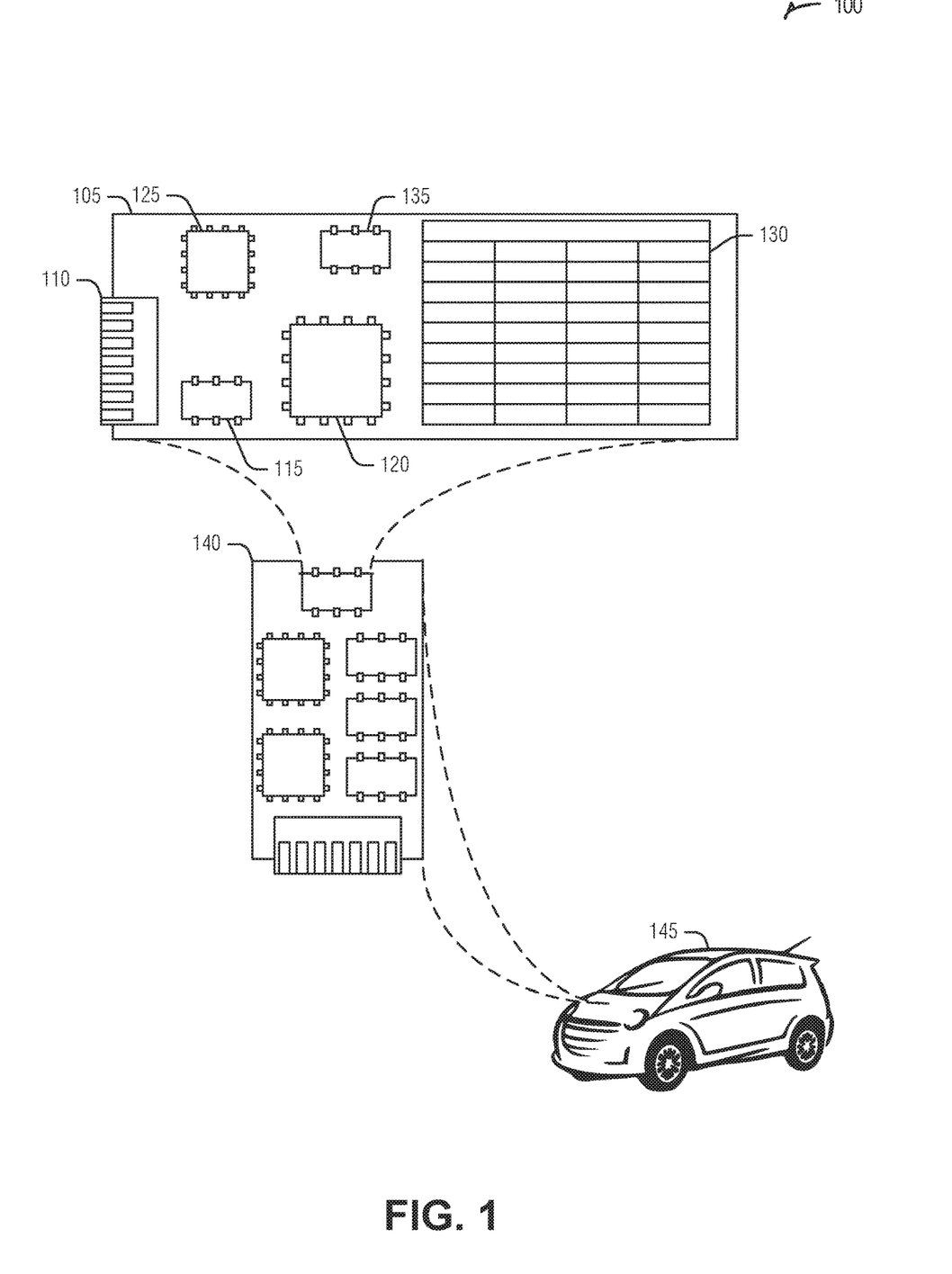
FIG. 1 is a block diagram of an example of an environment including a system for an authenticated modify operation in a storage device, according to an embodiment.

FIG. 1 is a block diagram of an example of an environment 100 including a system (e.g., storage device 105 or the components therein) for an authenticated modify operation in a storage device, according to an embodiment. The environment 100 includes the system 140 embedded into a manufactured good 145. The manufactured good 145 can include a variety of things, such as a vehicle (as shown) including unmanned vehicles, an appliance, furniture, a structure, a sensor, clothing, or other items in which the system 140 can be included (e.g., embedded). Recent trends to create "smart" items or add communication capabilities to goods that previously operated without such abilities, such as many appliances (e.g., refrigerators, washing machines, etc.) or sensors can be referred to as creating the IoT, the participating goods being transformed in to IoT devices.

The system 140 can include an interface to communicate with one or more components of the manufactured good 145 that are external to the system 140. For example, if the system 140 is an in-vehicle entertainment system, the interface enables the system 140 to control speakers, and can enable receiving content from a user's device (e.g., phone, personal music player, tablet, etc.). The system 140 can also include one or more processors (e.g., central processing unit, low-power processor, digital signal processor, graphic processing unit, etc.), and one or more storage devices (e.g., mass storage, memory, static memory, etc.) include the storage device 105.

The storage device 105 includes an interface 110, a decoder 115, a controller 120, a cryptographic engine 125, and a storage portion 130. In an example, the storage device 105 and the components therein are manufactured on a single chip. In an example, the storage device 105 includes a register bank 135 (e.g., comprising one or more registers). All of these components of the storage device 105 are implemented in computer hardware (e.g., processing circuitry).

The interface 110 provides a hardware communications medium between the storage device 105 and other components of the system 140. In an example, the interface 110 is a Joint Electron Device Engineering Council (JEDEC) memory standards interface. In an example, the storage device 105 is a random access memory (RAM) device. In an example, the interface 110 conforms to at least one of an Integrated Device Electronics (IDE) AT Attachment (ATA) interface, a serial ATA (SATA) interface, a Small Computer System Interface (SCSI) interface, a Universal Flash Storage (UFS) interface, an embedded MultiMedia Card (eMMC) interface or Non-Volatile Memory Host Controller Interface Specification (NVMHCI) interface. In an example, the storage device 105 is a flash memory device. In an example, the storage device 105 is at least one of NOR flash or NAND flash (e.g., the storage portion 130 is NOR or NAND flash). In an example, the storage device 105 is a hard disk drive (HDD).

The decoder 115 is arranged to parse a command, a set of input identifications, and a signature from a data transmission received at the interface 110. Here, the command is an authenticated modify command, also known as Auth_Modify or auth_modify command. In an example, the decoder 115 is arranged to decode other commands, such as a read or a write command to the storage device 105. In an example, the decoder 115 is part (e.g., integrated into) the controller 120.

In an example, the command corresponds to a cryptographic operation, such as a hash operation. A hash operation accepts input data and produces a hash of the input data as output. Typically a hash maps arbitrarily sized data to a fixed size. Although not required, it is generally desirable for differing input data to produce different output from the hash. When two different input data produce the same output it is called a collision. A cryptographic hash can differ from other hashes in being one-way. That is, it is difficult to produce the input data from just the output of the hash.

In an example, the hash operation is a keyed-hash message authentication code (HMAC). An HMAC is a message authentication code (MAC) where a key is combined with other data to produce the hash. HMACs can be used to verify one or both of data integrity and authenticity of a message (e.g., the other data). In an example, the data transmission includes a secret. Here, the secret is used as a key for the HMAC. In an example, the data transmission includes a current session key of the storage device 105. In this example, the storage device 105 can have previously entered into encrypted communications with the external entity. As part of establishing these communications, a session key can have been established between the storage device 105 and the external entity. The storage device 105 can maintain the same, or a derivative of, the session key for a number of communications or for a set period of time. In an example, the storage device 105 can uses a new session key each time it is power cycled (e.g., restarted, turned-on, etc.). The storage device 105 can maintain the session key internally, such as in the register bank 135 (or other internal memory) or in a protected part of the storage portion 130.

In an example, a member of the set of input identifications is an address of an unsecured portion of the storage device 105, such as the storage portion 130 or the register bank 135. In an example, the unsecured portion of the storage device 105 is accessible to an external entity via the interface 110 to the storage device 105. Thus, in a typical operation of a flash device, for example, the storage portion 130 is used to hold data that external entities read from and write to via commands to the storage device 105 made via the interface 110. In contrast, the register bank 135 would not generally be accessible to these external entities via the interface 110 but would rather be used by the controller 120 (or other portion of the storage device 105) for internal purposes. In an example, the unsecured portion of the storage device is block addressable, such as a NAND flash device or a hard disk drive.

In an example, the unsecured portion of the storage device 105 is byte addressable. Generally, though not exclusively, byte addressable storage is used to store data immediately prior to consumption by a processor. Thus, data can be retrieved from non-byte addressable storage (e.g., block addressable storage) into byte addressable storage before being operated upon by a processor. Example byte addressable media can include registers, RAM varieties (e.g., static RAM (SRAM), dynamic RAM (DRAM), etc.), core memory, NOR flash, etc. In an example, the unsecured portion of the storage device 105 is a register (e.g., in register bank 135). In an example, the unsecured portion of the storage device 105 is a nonvolatile storage media, such as NOR flash. In an example, the unsecured portion of the storage device 105 is not accessible to an external entity via the interface 110 to the storage device 105, such as the register bank 135.

In an example, the set of input identifications define an address range of the unsecured portion of the storage device 105. For example, the set of input identifications can be a list of storage blocks in the storage portion 130 of, for example, a flash device or a hard disk. The set of input identifications can be a set of byte addressable address in a storage portion 130 that is RAM. In an example, two members of the set of input identifications define the address range. This example permits the identification of a contiguous portion of the storage portion 130, for example, to reduce the signaling overhead. In an example, a first member of the two members defines the start of the range and a second member of the two members defines the end of the range. In an example, a first member of the two members defines the start of the range and a second member of the two members defines a number of units to include in the range.

In an example, a member of the set of input identifications identifies a portion of the data transmission. Whereas above, the input identifications note data already managed by the storage device 105, here, the command can be accompanied by additional data not already managed by the storage device 105. In an example, the portion of the data transmission is identified by a field. In an example, the portion of the data transmission is identified by an offset. In an example, the portion of the data transmission is also identified by a length. Thus, given these last few examples, the new data in the transmission can specify the additional data using a variety of techniques.

The controller 120 is arranged to collect members of the set of input identifications to produce an input set. The collection can include retrieving data that corresponds to addresses in the set of input identification or obtaining (e.g., retrieving or receiving) the data (e.g., a secret) from the transmission to include in the input set. The collection allows the use of previously managed (e.g., stored) data in the storage device 105 to be used the authenticated modify or other cryptographic operation. Thus, the input set includes data rather than references to data.

The controller 120 is arranged to instruct the cryptographic engine 125 to produce a signature of the input set. In an example, the signature is a cryptographic hash of at least the input set. In an example, the cryptographic hash is also of a secret, such as a storage device session key, such that the signature is an HMAC.

The controller 120 is arranged to compare the signature decoded from the data transmission at interface 110 by the decoder 115 to the signature created by the cryptographic engine 125 from the input data set. Because the signatures are readily computable from data, but extremely difficult to produce the same signature from different data, the signature provided by the entity that wrote the data to the unsecured portion 130 of the storage device in the data transmission should match that of the input data set (e.g., the data written to the unsecured portion 130) unless it has been modified. Thus, the controller 120 is arranged to compare the two signatures to determine whether the signatures match. If the signatures do not match, the data in the input set is not what the external entity expected, and thus may be maliciously or erroneously modified. In an example, the authenticated modify command simply fails when the signatures do not match. In an example, the controller 120 erases the input data set from the unsecured storage portion in response to a mismatch in the signatures.

When the signatures do match, then the data of the input set is moved to a secure portion of the storage device 105. In an example, the secured portion is managed via a bitmap of storage segments (e.g., pages, blocks, etc.), or other data structure that marks the secured storage portions. In an example, legacy write commands fail when they include a secured portion, such that only the authenticated modify command is supported by the controller 120 to modify the secured portion. In an example, legacy erase commands are not supported on the secured portion, such that only an erase variant of the authenticated modify command is supported to erase a secure portion. In an example, the authenticated modify command variant to erase a secure portion does not include a signature in the data transmission. Rather, this variant of the command uses an HMAC or other secret sent in the data transmission to erase the secure portion.

Although the authenticated modify command ensures that only an authorized write occurs to a secured portion of the storage device 105, it does not affect reading of the secured portion. To address a man-in-the-middle attack that may occur, for example, on an unsecured bus (such as a controller area network (CAN) bus common in automobiles), the controller 120 can provide a signature, or hash, of the data in addition to the data when it is read. Here, the receiver (e.g., system 140) can compare a signature it derived from the data it received from the storage device 105, to the signature provided by the storage device 150. Again, if the signatures match, the data is uncorrupted. To support this activity, in an example, the controller 120 is also arranged to instruct the cryptographic engine 125 to produce a hash product from the input set. The hash product is at least a hash of the input set data. As noted above, the hash product can be an HMAC. In this example, the cryptographic engine 125 is arranged to implement a cryptographic hash. In an example, the cryptographic hash is a secure hash algorithm (SHA). In an example, the cryptographic engine 125 is arranged to produce a two hundred and fifty-six bit hash.

In an example, the controller 120 is also arranged to write the hash product in a portion (e.g., storage portion 130) of the storage device 105 corresponding to the output identification. This completes the ability for the storage device to both use data it already manages, create the hash product, and store that hash product itself. Thus, an external entity can write data to be hashed to the storage device 105 as it normally would when otherwise storing the data. The external entity can then invoke the hash operation via the command and specify a response internal to the storage device 105 for the result. The external entity can then retrieve the hash product in the same way it would otherwise retrieve data from the storage device, such as by a read command.

This arrangement provides several benefits. For example, because the interface 110 conforms to other interface standards or types for the type of storage device, the storage device 105 can be added to any system 140 configured to accept the same type of storage device. Additionally, the authenticated modify command structure—e.g., write unsecured data, provide a signature of the written data in the authenticated modify request, and an atomic compare and copy of the unsecured data to a secure location—provides an elegant and straightforward way for programmers to implement a secure write. Further, the write, hash, read instruction cycle provides a familiar and flexible hash facility to programmers because the writing of the data and the reading of the hash product occur in a familiar fashion to other storage devices. In this way, security functions, such as HMAC messaging, or other upgrades can be added to existing systems without additional manufacturing expense to original equipment manufacturers, and thus further the penetration of systems into manufactured goods.

Figure 2:
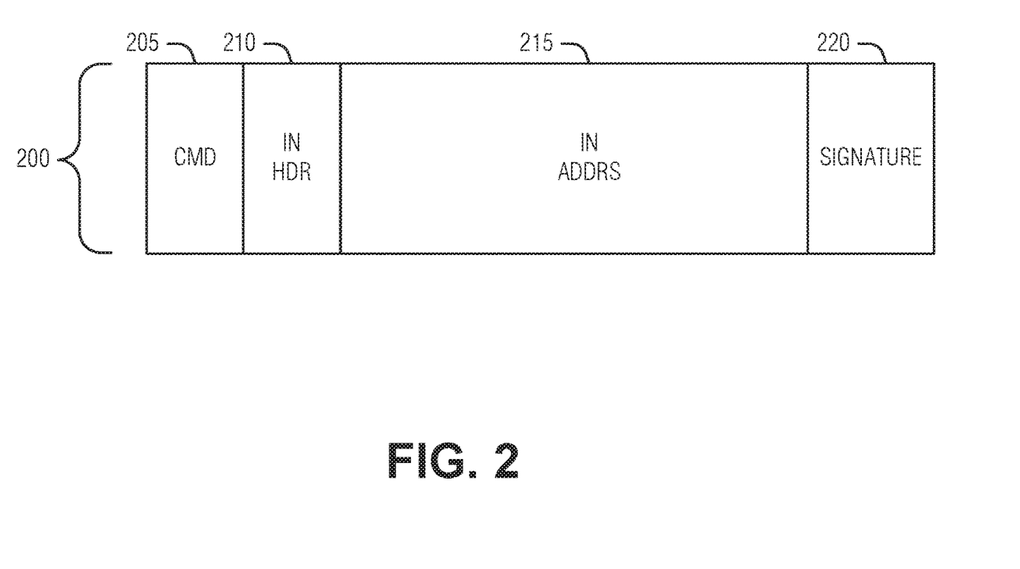
FIG. 2 illustrates an example of a message to the storage device to perform an authenticated modification, according to an embodiment.
Figure 3:
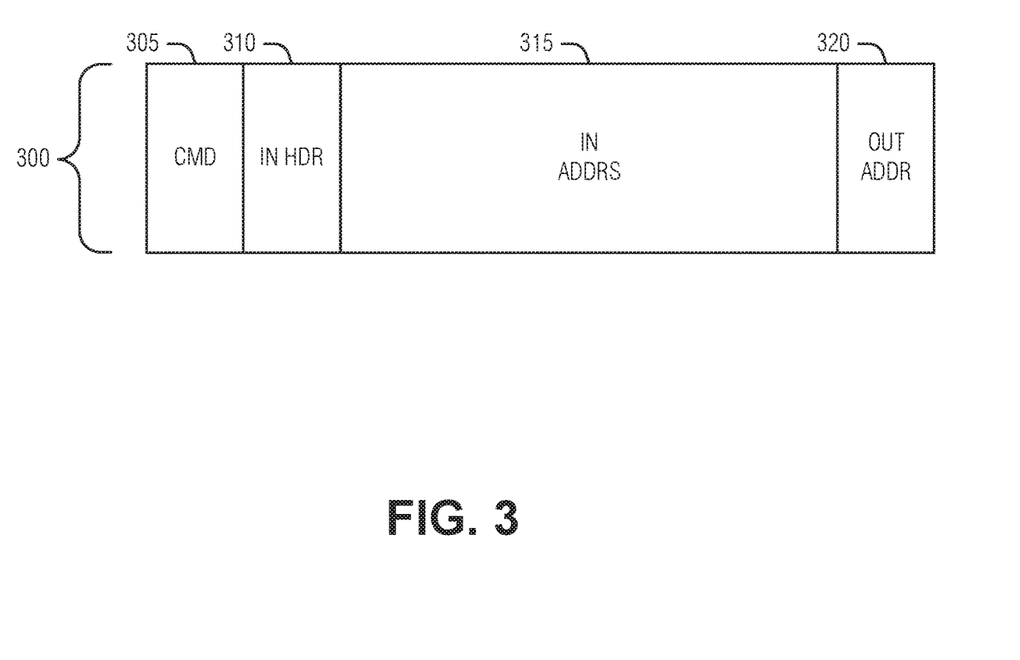
FIG. 3 illustrates an example of a message to the storage device to invoke production of a hash by the storage device, according to an embodiment.

FIGS. 2-3 illustrates an example of a message 300 to the storage device. The message formats discussed here are non-limiting examples. Portions of the messages can be denoted by fields (e.g., tags in a markup language such as eXtensible Markup Language (XML) or the like) or by convention (e.g., the first eight bits designate the command, the second eight bits designate an input header, etc.). Further, the messages are illustrated with a particular order of portions (e.g., command, input header, input addresses, and output address) but variations can include a rearranging of these components (e.g., no input header, an output address, input addresses, and then the command).

FIG. 2 illustrates an example of a message 200 to the storage device to perform an authenticated modification, according to an embodiment. The message 200 includes a command portion 205, an input header 210, an input address portion 215, and a signature portion 220. The various portions other than the signature portion operate as described below with respect to message 300.

The signature portion holds a signature of data corresponding to the authenticated modification command specified in the command portion 205. In an example, the signature portion is a reference (e.g., address) to the signature in the storage device. In an example, the signature portion contains an HMAC of the data.

FIG. 3 illustrates an example of a message 300 to the storage device to invoke a hash operation, according to an embodiment. The message 300 includes four portions, a command portion 305, an input header 310, an input address portion 315, and an output address 320. In an example, the command portion 305 is placed and sized according to a standard interface to the storage device. For example, if the interface of the storage device is SCSI, the first eight-bit byte is the command portion 305. The input header 310 is optional and can be used to describe the type of data in the input address portion 315. For example, if the input address portion 315 is sized for two addresses, the input header 310 can specify whether the input address portion 315 is to be treated as two distinct addresses or as a range (e.g., a start and end address or a start address and an extent). The output address 320, as described above, designates the destination of the hash product produced when the cryptographic engine performs the hash operation of the command from the command portion 305.

In an example, the message 300 includes a secret portion. The secret portion holds a secret that can be used as a key to an HMAC. Here, the secret is the actual value of the key. In an example, message 300 also includes a secret address portion. The secret address portion holds an address to an addressable location within the storage device, such as internal NAND or NOR flash blocks, a register, memory, etc. using the secret address portion permits the use of larger secrets than can otherwise be possible given constraints of a particular storage interface standard. The external entity can write the secret to one or more blocks of the storage device in a previous operation and then refer to the secret via the secret address portion. In an example, the message 300 also includes a secret command portion. The secret command portion includes a directive to the storage device that specifies how to obtain the secret. An example directive can include retrieving a current session key of the storage device, or measuring a quality of the storage device using a diagnostic component. The secret command provides additional flexibility to leverage ever more sophisticated storage device hardware. Although a secret holding area (e.g., secret portion, secret address, or secret command portion) can be separate from the input address portion (e.g., 315), the secret holding area can be included in the input address portion and specified, for example, in the input header.

Figure 4:
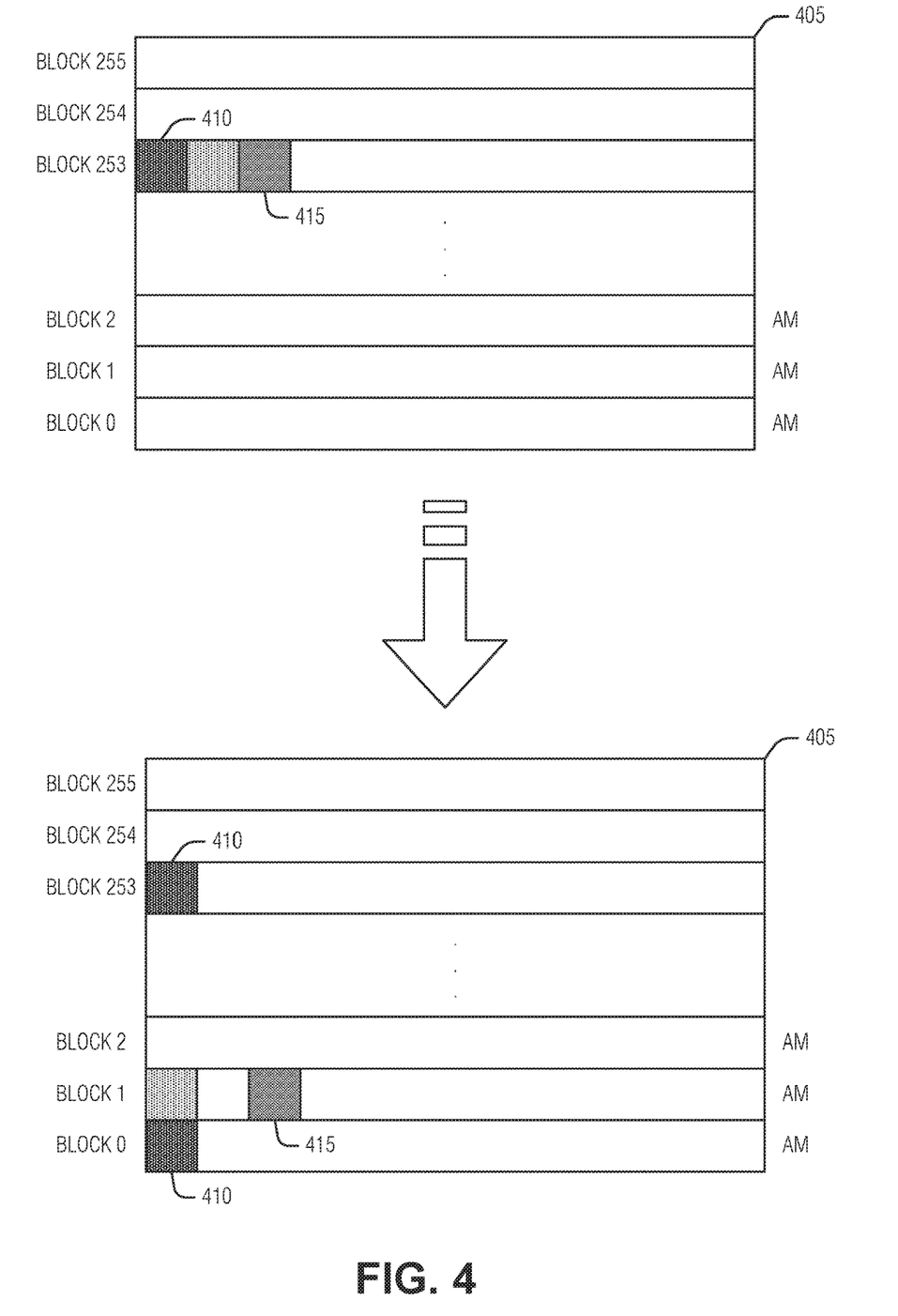
FIG. 4 illustrates blocks moving from an unsecured non-volatile buffer to a secured non-volatile location on a storage device in response to a successful authenticated modification operation, according to an embodiment.

FIG. 4 illustrates blocks moving from an unsecured non-volatile buffer to a secured non-volatile location on a storage device in response to a successful authenticated modification operation, according to an embodiment.

As noted above, the authenticated modification command prevents certain vulnerabilities present in block locking secure writing techniques. Another technique used in some memory devices—known as replay protect memory block (RPMB)—uses an authentication for every read and write, also promoting a secure write. However, RPMB is unsuitable to devices that cannot buffer the entirety of the write portions in order to perform authentication along with the data write to the storage device. The authenticated modification described herein, however, solves the RPMB issue by allowing an unsecured write to be followed by an atomic verification of the unsecured data and write (e.g., copy) from the unsecured area to the secured area.

The secure area or portion of the storage device are defined in meta-data, or control registers of the storage device. This defines trusted way for a user (e.g., customer) to specify—for example via a bitmap, partition, etc.—and determine that one or more erase blocks are only modifiable by an authenticated modification (e.g., Auth_Modify) command. In an example, the signature of the authenticated modification command is an HMAC Legacy program/erase will no longer work on these blocks signature of existing flash content and then allows it to be moved to a protected location in flash. When successfully executed, the new content is written atomically within a single flash command.

User control to configure, for example, 0 to 256 blocks (e.g., no blocks up to all array 64-KByte blocks) to be each be "Authenticated Modify" (AM). Block configuration & status can be limited to only HMAC-signed commands, such as CRTM_Register_Write & CRTM_Register_Read commands. Legacy program & erase operations shall fail for AM blocks. Thus, the only way to modify AM blocks is through Auth_Modify command—such as copying flash content from any array location (e.g., a "flash buffer") to any AM block.

In an example, an Authenticated modify command can have several options. For example, command option zero can include a secure erase command that specifies the base address of an AM block to erase. In an example, erase suspend/resume functionality not supported for this command or for an AM block. This command option allows a host, for example, to securely free up storage space with AM block pool.

Another example command option includes copying existing flash content from one array location to an AM block. In an example, the copying has a 256-byte minimum granularity. In an example, the command requires address alignment. In an example, the command has a 64-KByte maximum granularity. In an example, erase suspend/resume functionality not supported for this command or for an AM block.

The host, or other entity with access to the storage device interface, can use authenticated modify in a number of ways. For example, the host can use CRTM_Register_Write to allocate blocks for AM protection (the AM block pool), or CRTM_Register_Read to read authenticated protection status of AM-protected blocks. When AM space is desired, the host can invoke the Auth_Modify command option zero to erase AM block. In an example, the host can use command one of Auth_Modify to add content to an AM block. In an example, the copying of data can be from an unsecured (e.g., non-AM) or from a secured (e.g., AM) block to a secured block. In an example, anti-replay protection is provided by a monotonic counter of the storage device. In an example, the key association of the storage device is a replaceable root key and a session key per storage device power cycle.

In operation, as shown in FIG. 4, the storage device 405 starts with data 410 and 415 in unsecured portions (e.g., flash buffer) of the storage device 405. After the authenticated modify command, the data is moved to the secured portions (e.g., AM) portions of the storage device. Note, it is optionally whether the data in the unsecured portion is erased as part of the copy. For example, the data 410 is not erased from the unsecured portion while the data 415 is.

Figure 5:
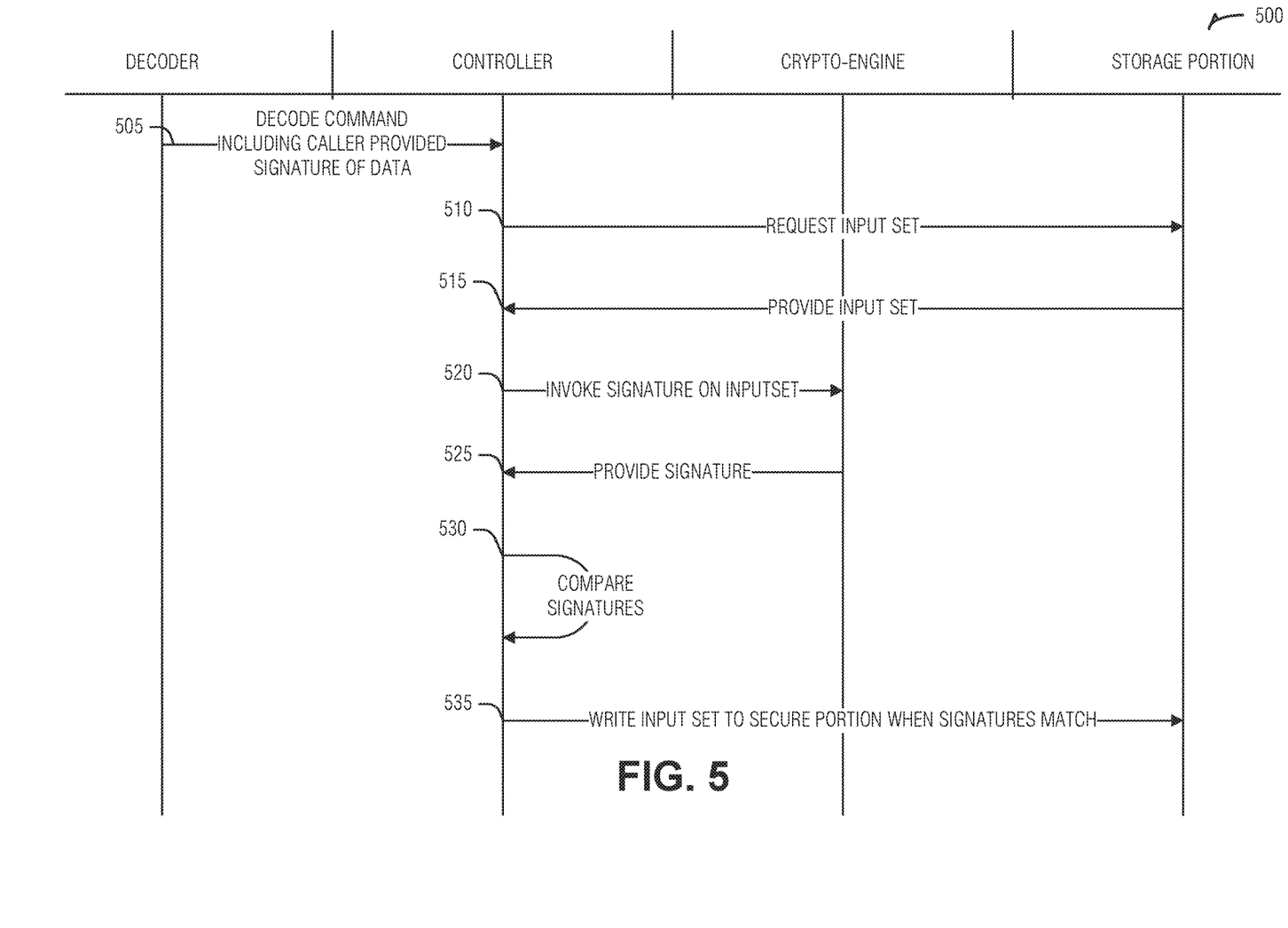
FIG. 5 is a swim lane diagram illustrating an example of component messaging within a storage device to perform an authenticated modification, according to an embodiment.

FIG. 5 is a swim lane diagram illustrating an example of component messaging 500 within a storage device to perform an authenticated modification, according to an embodiment. After the storage device receives a data transmission, it is decoded by a decoder and sent to the controller (message 505). In this context, the decoded command is an authenticated modify command that is distinct from a legacy, or standard, write or program command by virtue of its inclusion of a signature for data that is subject to the command. In contrast to RPMB, or the like, the data from which the signature is created is not part of the data transmission to the storage device. Rather, the data was previously placed onto the storage device via a legacy write.

The decoded transmission also included identification of the data previously stored by the initiator (e.g., a host) of the command. The controller uses this identification to request (message 510) and receive (message 515) an input set from the storage of the storage device. The controller then requests that the cryptographic engine of the storage device produce a signature of the input set (message 520). In an example, the controller does not actually receive the input set from the storage portion and rather directs the cryptographic engine to the data of the input set, the cryptographic engine reading the data itself to produce the signature. Once complete, the cryptographic engine provides the signature of the input set back to the controller (message 525).

The controller then compares the signature received in the data transmission to that provided by the cryptographic engine (operation 530). If the signatures match, then the data initially written by the requestor has not been modified, and it is written to a secure portion (e.g., an AM configured block or partition) of the storage portion of the storage device (message 535). Otherwise, if the signatures do not match, the data specified at the input set does not match what the requestor expects (e.g., because it was maliciously or erroneously changed), and the authenticated modification operation fails.

Figure 6:
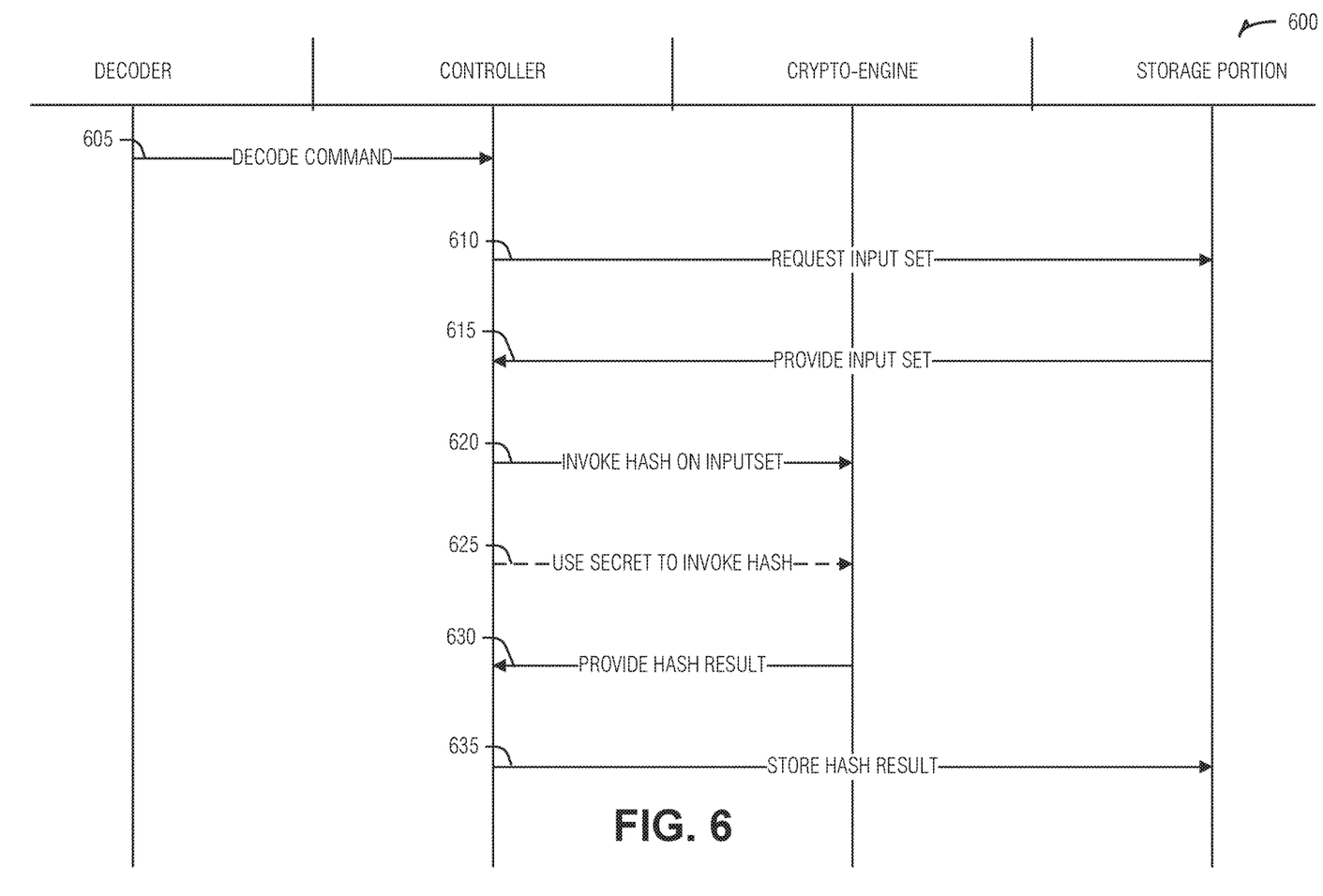
FIG. 6 is a swim lane diagram illustrating an example of component messaging within a storage device to produce a hash, according to an embodiment.

In an example, the data transmission itself can be secured via a hash operation, such as that supported by the message 300 described above. In an example, data read from a secure portion can be verified-insurance against modification of the data between the storage portion and a reading entity-via providing a hash signature of the data in response to a read, as described below with the component messaging 600.

FIG. 6 is a swim lane diagram illustrating an example of component messaging 600 within a storage device to produce a hash, according to an embodiment. After a transmission is received at the interface to the storage device, the decoder decodes the command in the message (operation 605). The controller can then marshal data from the set of input identifications by requesting the data corresponding to the set of input identification (operation 610) from the storage portion and receive the input set data as provided by the storage portion (operation 615).

Once the input set is marshalled, the controller invokes the hash operation of the command on the input set (operation 620). Optionally, the controller can provide a key to the cryptographic engine as part of the hash operation invocation (operation 625). The cryptographic engine then provides the hash result (e.g., hash product) back to the controller (operation 630). The controller then stores the hash result in the storage portion as specified in the input message (e.g., the output address) (operation 635.

Figure 7:
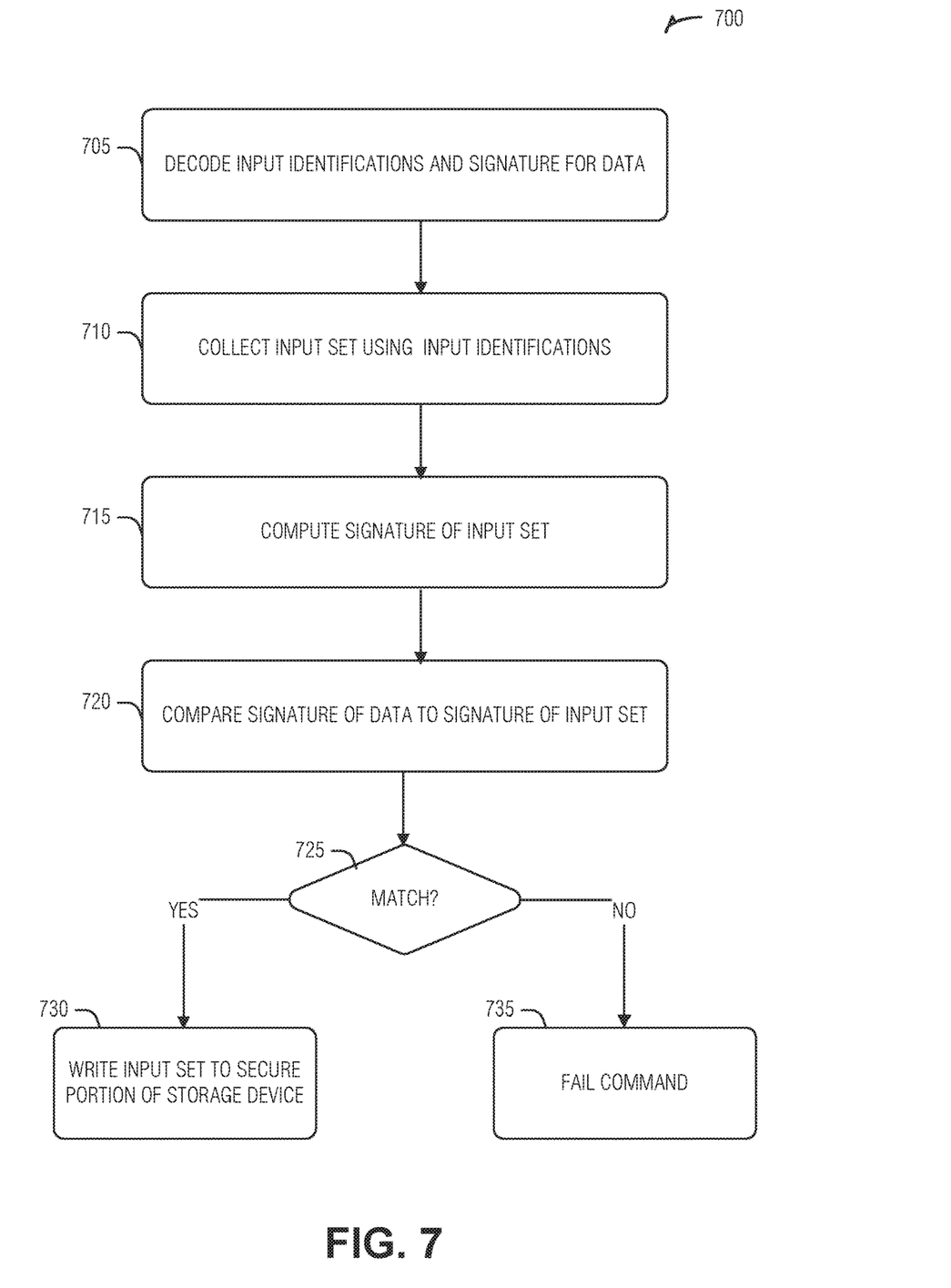
FIG. 7 illustrates a flow diagram of an example of a method for multi-factor intelligent agent control, according to an embodiment.

FIG. 7 illustrates a flow diagram of an example of a method 700 for multi-factor intelligent agent control, according to an embodiment. The operations of the method 700 are carried out on computer hardware, such as that described above with respect to FIG. 1, or below with respect to FIG. 8 (e.g., circuitry).

At operation 705, a data transmission received at an interface of the storage device is decoded. Here, the data transmission includes a command, a set of input identifications, and a signature corresponding to data at the input identifications. The command corresponds to an authenticated modification, or auth_modify, operation.

In an example, the set of input identifications define an address range of an unsecured portion of the storage device. In an example, two members of the set of input identifications define the address range. In an example, a first member of the two members defines the start of the range and a second member of the two members defines the end of the range. In an example, a first member of the two members defines the start of the range and a second member of the two members defines a number of units to include in the range.

In an example, a member of the set of input identifications identifies a portion of the data transmission. In an example, the portion of the data transmission is identified by a field. In an example, the portion of the data transmission is identified by an offset. In an example, the portion of the data transmission is also identified by a length.

In an example, the data transmission includes an identification of the secure portion. In an example, the secure portion is readable to an external entity (e.g., the host or other entity using the storage device interface that is not the storage device or a component thereof). In an example, the data transmission identifies a secret of the storage device. In an example, the secret is a current session key of the storage device.

In an example, the interface of the storage device is a Joint Electron Device Engineering Council (JEDEC) memory standards interface. In an example, the storage device is a random access memory (RAM) device.

In an example, the interface of the storage device conforms to at least one of an Integrated Device Electronics (IDE) AT Attachment (ATA) interface, a serial ATA (SATA) interface, Small Computer System Interface (SCSI) interface, or Non-Volatile Memory Host Controller Interface Specification (NVMHCI) interface. In an example, the storage device is a flash memory device. In an example, the flash memory device is at least one of NOR flash or NAND flash. In an example, the storage device is a hard disk drive (HDD).

At operation 710, members of the set of input identifications are marshalled to produce an input set. Marshalling involves collecting the data identified in the input notifications and placing the data into the input set. In an example, marshalling the members of the set of input identifications includes retrieving data corresponding to an address of the set of input identifications to include in the input set.

At operation 715, a cryptographic engine of the storage device is invoked on the input set to produce a signature from the input set. In an example, the cryptographic engine implements a cryptographic hash. In an example, the cryptographic hash is a secure hash algorithm (SHA). In an example, the cryptographic engine produces a two hundred and fifty-six bit hash or a five hundred and twelve bit hash.

At operation 720, the first signature that was received as part of the data transmission and the second signature that was generated from the input set by the cryptographic engine are compared. If they match (decision 725), then, at operation 730, the input set is written to the secure portion of the storage device. The writing can include instructing an underlying storage device controller to copy the data of the input set from the unsecure portion to the secure portion, or it can include reading the data into the controller and writing it out to the secure portion. If the signatures do not match (decision 725), then, at operation 735, the command fails. In an example, notification of the command failure is sent back to the requestor.

In an example, the method 700 can be extended to include creating a third signature of data in the secure portion in response to a read request to which that data was returned. In an example, the signature is in response to a second command that is related to the read request.

Figure 8:
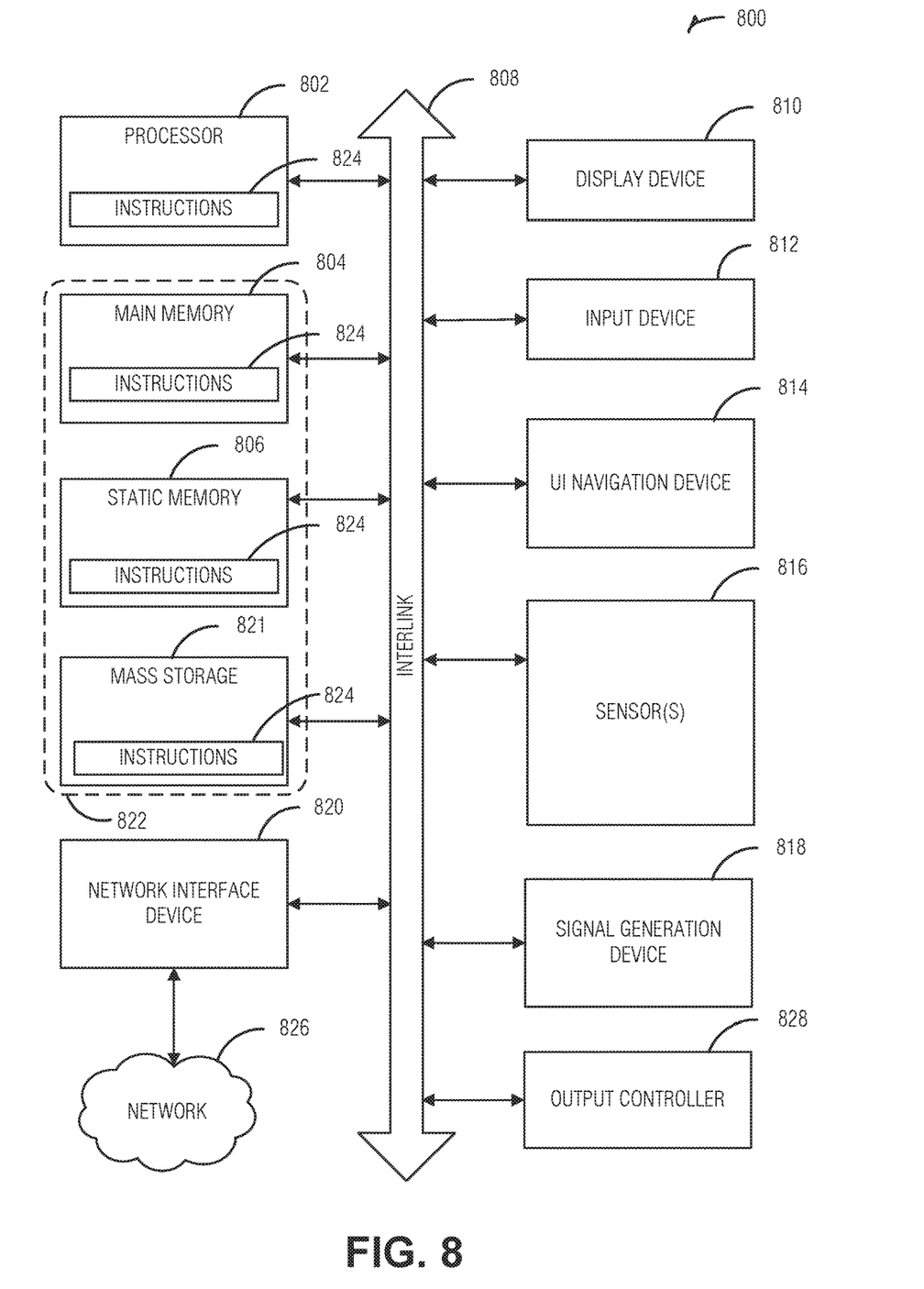
FIG. 8 is a block diagram illustrating an example of a machine upon which, or with which, one or more embodiments can be implemented.

FIG. 8 illustrates a block diagram of an example machine 800 upon which any one or more of the techniques (e.g., methodologies) discussed herein can perform. Examples, as described herein, can include, or can operate by, logic or a number of components, or mechanisms in the machine 800. Circuitry (e.g., processing circuitry) is a collection of circuits implemented in tangible entities of the machine 800 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 800 follow.

In alternative embodiments, the machine 800 can operate as a standalone device or can be connected (e.g., networked) to other machines. In a networked deployment, the machine 800 can operate in the capacity of a server machine, a client machine, or both in server-client network environments. In an example, the machine 800 can act as a peer machine in peer-to-peer (P2P) (or other distributed) network environment. The machine 800 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 800 can include a hardware processor 802 (e.g., a central processing unit (CPU), a graphics processing unit (GPU), a hardware processor core, or any combination thereof), a main memory 804, a static memory (e.g., memory or storage for firmware, microcode, a basic-input-output (BIOS), unified extensible firmware interface (UEFI), etc.) 806, and mass storage 821 (e.g., hard drive, tape drive, flash storage, or other block devices) some or all of which can communicate with each other via an interlink (e.g., bus) 808. Main memory 804 is generally distinguishable from mash storage 821 by being byte addressable versus block addressable allowing direct consumption of its data by the processor 802. Further, main memory 804 is used by the processor 802 to store current (e.g., live) state information rather than information maintained between power-on and power-off cycles. The static memory 806 is generally used to directly modify or configure hardware, such as occurs on power-up, or to correct machine instructions (e.g., via microcode).

The machine 800 can further include a display unit 810, an alphanumeric input device 812 (e.g., a keyboard), and a user interface (UI) navigation device 814 (e.g., a mouse). In an example, the display unit 810, input device 812 and UI navigation device 814 can be a touch screen display. The machine 800 can additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 can include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The registers of the processor 802, the main memory 804, the static memory 806, or the mass storage 816 can be, or include, a machine readable medium 822 on which is stored one or more sets of data structures or instructions 824 (e.g., software) embodying or utilized by any one or more of the techniques or functions described herein. The instructions 824 can also reside, completely or at least partially, within any of registers of the processor 802, the main memory 804, the static memory 806, or the mass storage 816 during execution thereof by the machine 800. In an example, one or any combination of the hardware processor 802, the main memory 804, the static memory 806, or the mass storage 816 can constitute the machine readable media 802. While the machine readable medium 822 is illustrated as a single medium, the term "machine readable medium" can include a single medium or multiple media (e.g., a centralized or distributed database, and/or associated caches and servers) configured to store the one or more instructions 824.

The term "machine readable medium" can include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples can include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 can be further transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 820 can include one or more physical jacks (e.g., Ethernet, coaxial, or phone jacks) or one or more antennas to connect to the communications network 826. In an example, the network interface device 820 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software. A transmission medium is a machine readable medium.

ADDITIONAL NOTES & EXAMPLES

Example 1 is a storage device that implements an authenticated modify, the storage device comprising: a cryptographic engine; an interface; a decoder to parse a command, a set of input identifications, and a first signature from a data transmission received at the interface; and a controller to: collect members of the set of input identifications to produce an input set; instruct the cryptographic engine to produce a second signature from the input set; compare the first signature and the second signature to determine a match; and write the input set to a secure portion of the storage device in response to the match.

In Example 2, the subject matter of Example 1 includes, wherein the set of input identifications define an address range of an unsecure portion of the storage device.

In Example 3, the subject matter of Example 2 includes, wherein two members of the set of input identifications define the address range.

In Example 4, the subject matter of Example 3 includes, wherein a first member of the two members defines the start of the range and a second member of the two members defines the end of the range.

In Example 5, the subject matter of Examples 3-4 includes, wherein a first member of the two members defines the start of the range and a second member of the two members defines a number of units to include in the range.

In Example 6, the subject matter of Examples 1-5 includes, wherein the data transmission includes an identification of the secure portion.

In Example 7, the subject matter of Examples 1-6 includes, wherein the secure portion of the storage device is readable to an external entity via the interface to the storage device.

In Example 8, the subject matter of Example 7 includes, wherein the controller is to create a third signature of the secure portion in response to a read operation.

In Example 9, the subject matter of Example 8 includes, wherein the controller is to provide the third signature to the external entity in response to a verification instruction including a reference to the read operation.

In Example 10, the subject matter of Examples 1-9 includes, wherein the data transmission identifies a secret of the storage device.

In Example 11, the subject matter of Example 10 includes, wherein the secret is a current session key of the storage device.

In Example 12, the subject matter of Examples 1-11 includes, wherein the first signature and the second signature include is a keyed-hash message authentication code (HMAC).

In Example 13, the subject matter of Example 12 includes, wherein a secret of the storage device is used as a key for the HMAC.

In Example 14, the subject matter of Examples 1-13 includes, wherein the cryptographic engine implements a cryptographic hash.

In Example 15, the subject matter of Example 14 includes, wherein the cryptographic hash is a secure hash algorithm (SHA).

In Example 16, the subject matter of Example 15 includes, wherein the cryptographic engine produces a two hundred and fifty-six bit hash.

In Example 17, the subject matter of Examples 1-16 includes, wherein the interface of the storage device is a Joint Electron Device Engineering Council (JEDEC) memory standards interface.

In Example 18, the subject matter of Example 17 includes, wherein the storage device is a random access memory (RAM) device.

In Example 19, the subject matter of Examples 1-18 includes, wherein the interface of the storage device conforms to at least one of an Integrated Device Electronics (IDE) AT Attachment (ATA) interface, a serial ATA (SATA) interface, a Small Computer System Interface (SCSI) interface, a Universal Flash Storage (UFS) interface, an embedded MultiMedia Card (eMMC) interface, or Non-Volatile Memory Host Controller Interface Specification (NVMHCI) interface.

In Example 20, the subject matter of Example 19 includes, wherein the storage device is a flash memory device.

In Example 21, the subject matter of Example 20 includes, wherein the flash memory device is at least one of NOR flash or NAND flash.

Example 22 is a machine implemented method for authenticated modify in a storage device, the method comprising: decoding a data transmission received at an interface of the storage device, the data transmission including a command, a set of input identifications, and a first signature corresponding to data identified by the input identifications, the command corresponding to a secure portion of the storage device; marshalling members of the set of input identifications to produce an input set; invoking a cryptographic engine of the storage device on the input set to produce a second signature from the input set; comparing the first signature and the second signature to determine a match; and writing, in response to the match, the input set to a secure portion of the storage device.

In Example 23, the subject matter of Example 22 includes, wherein the set of input identifications define an address range of an unsecure portion of the storage device.

In Example 24, the subject matter of Example 23 includes, wherein two members of the set of input identifications define the address range.

In Example 25, the subject matter of Example 24 includes, wherein a first member of the two members defines the start of the range and a second member of the two members defines the end of the range.

In Example 26, the subject matter of Examples 24-25 includes, wherein a first member of the two members defines the start of the range and a second member of the two members defines a number of units to include in the range.

In Example 27, the subject matter of Examples 22-26 includes, wherein the data transmission includes an identification of the secure portion.

In Example 28, the subject matter of Examples 22-27 includes, wherein the secure portion of the storage device is readable to an external entity via the interface to the storage device.

In Example 29, the subject matter of Example 28 includes, creating a third signature of the secure portion in response to a read operation.

In Example 30, the subject matter of Examples 28-29 includes, providing the third signature to the external entity in response to a verification instruction including a reference to the read operation.

In Example 31, the subject matter of Examples 22-30 includes, wherein the data transmission identifies a secret of the storage device.

In Example 32, the subject matter of Example 31 includes, wherein the secret is a current session key of the storage device.

In Example 33, the subject matter of Examples 22-32 includes, wherein the first signature and the second signature include is a keyed-hash message authentication code (HMAC).

In Example 34, the subject matter of Example 33 includes, wherein a secret of the storage device is used as a key for the HMAC.

In Example 35, the subject matter of Examples 22-34 includes, wherein the cryptographic engine implements a cryptographic hash.

In Example 36, the subject matter of Example 35 includes, wherein the cryptographic hash is a secure hash algorithm (SHA).

In Example 37, the subject matter of Example 36 includes, wherein the cryptographic engine produces a two hundred and fifty-six bit hash.

In Example 38, the subject matter of Examples 22-37 includes, wherein the interface of the storage device is a Joint Electron Device Engineering Council (JEDEC) memory standards interface.

In Example 39, the subject matter of Example 38 includes, wherein the storage device is a random access memory (RAM) device.

In Example 40, the subject matter of Examples 22-39 includes, wherein the interface of the storage device conforms to at least one of an Integrated Device Electronics (IDE) AT Attachment (ATA) interface, a serial ATA (SATA) interface, a Small Computer System Interface (SCSI) interface, a Universal Flash Storage (UFS) interface, an embedded MultiMedia Card (eMMC) interface, or Non-Volatile Memory Host Controller Interface Specification (NVMHCI) interface.

In Example 41, the subject matter of Example 40 includes, wherein the storage device is a flash memory device.

In Example 42, the subject matter of Example 41 includes, wherein the flash memory device is at least one of NOR flash or NAND flash.

Example 43 is at least one non-transitory machine readable medium including instructions that, when executed by processing circuitry, cause the processing circuitry to perform any method of Examples 22-42.

Example 44 is a system comprising means to perform any method of Examples 22-42.

Example 45 is at least one machine-readable medium including instructions that, when executed by processing circuitry, cause the processing circuitry to perform operations to implement of any of Examples 1-44.

Example 46 is an apparatus comprising means to implement of any of Examples 1-44.

Example 47 is a system to implement of any of Examples 1-44.

Example 48 is a method to implement of any of Examples 1-44.

The above detailed description includes references to the accompanying drawings, which form a part of the detailed description. The drawings show, by way of illustration, specific embodiments that can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. A storage device comprising:
   a cryptographic engine;
   an interface to:
      receive a write, the write including data and specifying storage the data into an unsecured portion of the storage device; and
      receive a transmission that includes a command, a set of input identifications, and a first signature, the set of input identifications corresponding to the data written into the unsecured portion of the storage device;
   a decoder to parse the command, the set of input identifications, and the first signature from the data transmission received at the interface; and
   a controller to:
      collect members of the set of input identifications from the unsecured portion of the storage device to produce an input set;
      instruct the cryptographic engine to produce a second signature from the input set;
      compare the first signature and the second signature to determine a match; and
      write the input set from the unsecured portion of the storage device to a secure portion of the storage device in response to the match.

2. The storage device of claim 1, wherein the set of input identifications define an address range of the unsecure portion of the storage device.

3. The storage device of claim 1, wherein the data transmission includes an identification of the secure portion.

4. The storage device of claim 1, wherein the secure portion of the storage device is readable to an external entity via the interface to the storage device.

5. The storage device of claim 4, wherein the controller is to instruct the cryptographic engine to create a third signature of the secure portion in response to a read operation.

6. The storage device of claim 5, wherein the controller is to provide the third signature to the external entity in response to a verification instruction including a reference to the read operation.

7. The storage device of claim 1, wherein the data transmission identifies a secret of the storage device.

8. The storage device of claim 1, wherein the first signature and the second signature include is a keyed-hash message authentication code (HMAC).

9. The storage device of claim 1, wherein the interface of the storage device is a Joint Electron Device Engineering Council (JEDEC) memory standards interface.

10. The storage device of claim 1, wherein the interface of the storage device conforms to at least one of an Integrated Device Electronics (IDE) AT Attachment (ATA) interface, a serial ATA (SATA) interface, a Small Computer System Interface (SCSI) interface, a Universal Flash Storage (UFS) interface, an embedded MultiMedia Card (eMMC) interface, or Non-Volatile Memory Host Controller Interface Specification (NVMHCI) interface.

11. The storage device of claim 10, wherein the storage device is a flash memory device.

12. A machine implemented method for authenticated modify in a storage device, the method comprising:
   receiving, at an interface of the storage device, a write of data into an unsecured portion of the storage device;
   decoding a data transmission received at the interface, the data transmission including a command, a set of input identifications for the data written into the unsecured portion of the storage device, and a first signature corresponding to data identified by the input identifications, the command corresponding to a secure portion of the storage device;
   marshalling members of the set of input identifications from the unsecured portion of the storage device to produce an input set;
   invoking a cryptographic engine of the storage device on the input set to produce a second signature from the input set;
   comparing the first signature and the second signature to determine a match; and writing, in response to the match, the input set from the unsecured portion of the storage device to a secure portion of the storage device.

13. The method of claim 12, wherein the set of input identifications define an address range of the unsecure portion of the storage device.

14. The method of claim 12, wherein the data transmission includes an identification of the secure portion.

15. The method of claim 12, wherein the secure portion of the storage device is readable to an external entity via the interface to the storage device.

16. The method of claim 15, comprising creating a third signature of the secure portion, using the cryptographic engine, in response to a read operation.

17. The method of claim 15, comprising providing the third signature to the external entity in response to a verification instruction including a reference to the read operation.

18. The method of claim 12, wherein the data transmission identifies a secret of the storage device.

19. The method of claim 12, wherein the first signature and the second signature include is a keyed-hash message authentication code (HMAC).

20. The method of claim 12, wherein the interface of the storage device is a Joint Electron Device Engineering Council (JEDEC) memory standards interface.

21. The method of claim 12, wherein the interface of the storage device conforms to at least one of an Integrated Device Electronics (IDE) AT Attachment (ATA) interface, a serial ATA (SATA) interface, a Small Computer System Interface (SCSI) interface, a Universal Flash Storage (UFS) interface, an embedded MultiMedia Card (eMMC) interface, or Non-Volatile Memory Host Controller Interface Specification (NVMHCI) interface.

22. The method of claim 21, wherein the storage device is a flash memory device.

* * * * *